United States Patent Office 2,867,724
Patented Jan. 6, 1959

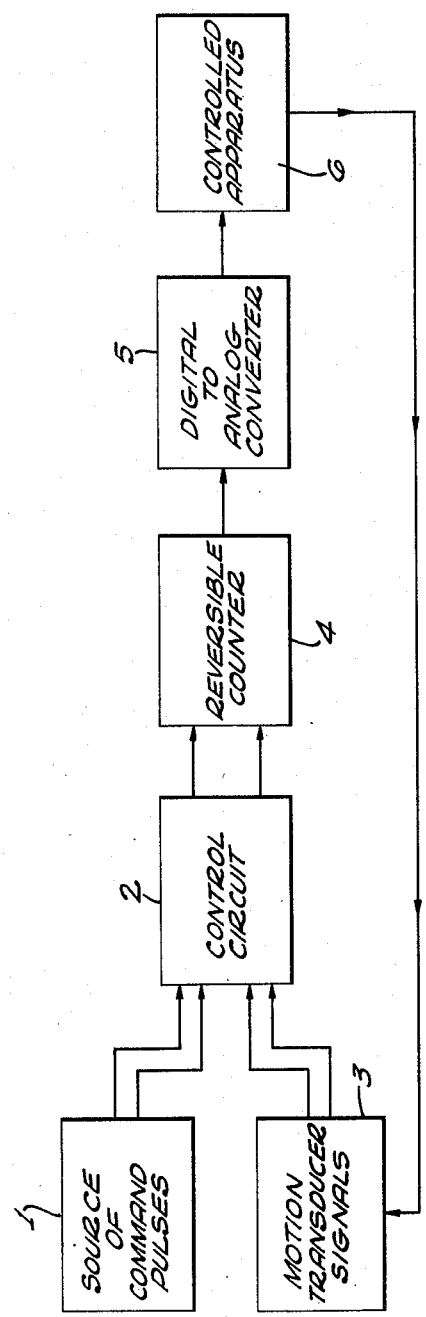

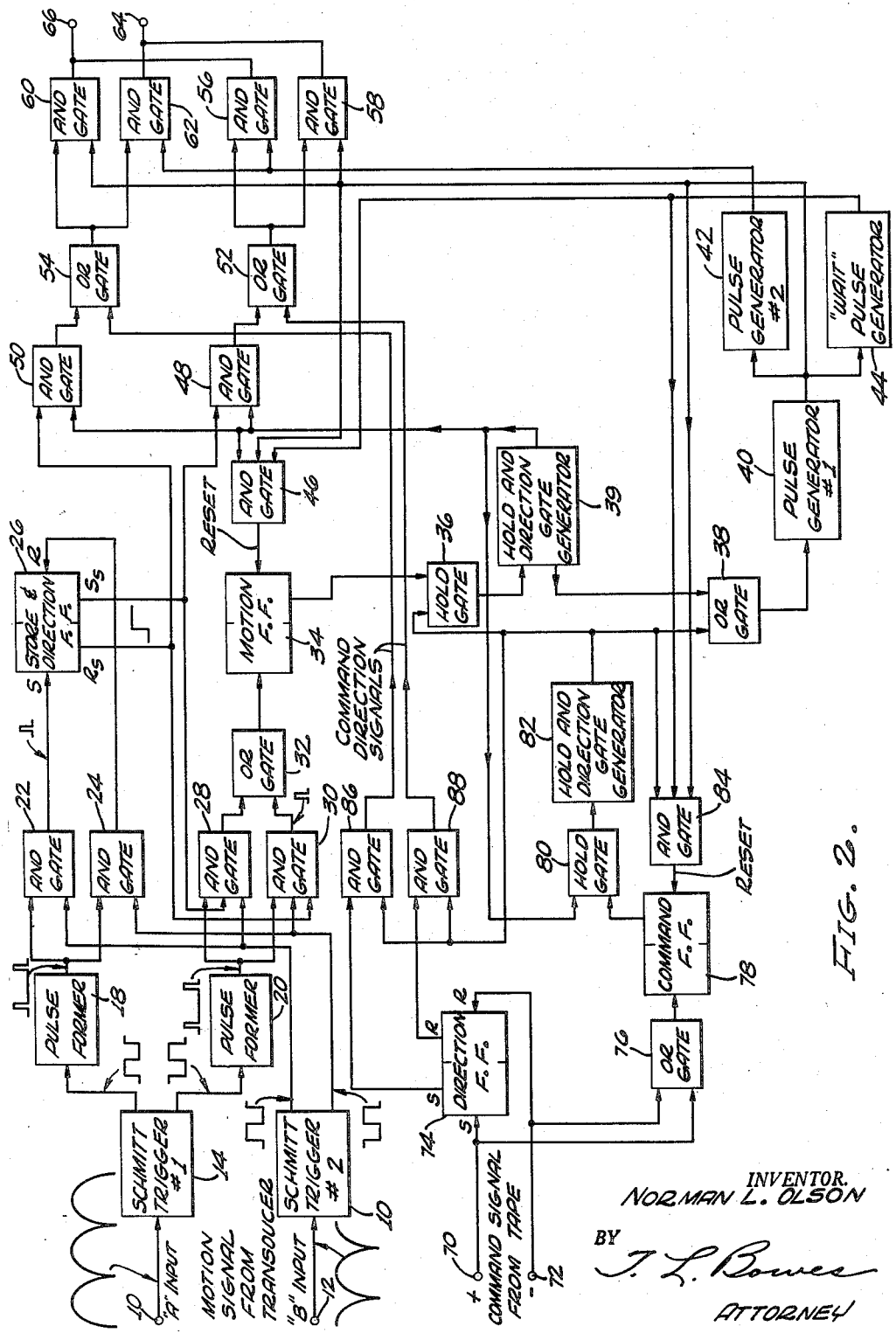

2,867,724

CONTROL CIRCUIT

Norman L. Olson, Los Angeles, Calif., assignor to General Dynamics Corporation, Rochester, N. Y., a corporation of Delaware Application November 23, 1956, Serial No. 623,937

8 Claims. (Cl. 250—27)

This invention relates to electrical servo control systems and, more particularly, to an improved control circuit for use in such systems.

In an application by Jack Rosenberg et al., Serial No. 544,478, filed November 2, 1955, for an Automation System, and assigned to a common assignee, there is described a machine-tool automation system wherein apparatus is provided for generating and recording command pulses which can order machine-tool movement to describe a desired path. An example of the type of apparatus controlled by the command pulses is a milling machine having a moving table upon which there may be fastened a workpiece. Above the workpiece is a cutting tool which is rotated at a rapid rate. The workpiece is moved in a desired path against the stationary cutting tool to obtain an end product having a desired shape.

Each command pulse represents an increment of motion required along a co-ordinate axis. For each co-ordinate there is a separate train of command pulses required. As the table of the machine tool moves in response to the command pulses, a motion transducer is used for each co-ordinate of motion which, in response to motion along that co-ordinate, produces response pulses for each motion increment.

In a digital servo-loop type of operation, the command pulses are applied to the loop to order the motion, the motion is executed, and response pulses as a result of such execution are generated by the motion transducer. In order to insure that the response is equal to the command, a register, or counter, is employed. The command pulses are applied to this counter to advance the count, and the output of the counter is converted by suitable digital-to-analog conversion apparatus to a voltage, or current, having an amplitude representative of the count in the counter. This digital-to-analog converter output is then applied to a motor which drives the machine-tool table. The response pulses are applied to the counter in a manner to be subtracted from the count indication as a result of the application of command pulses. Thus, when the counter output is zero, it is known that the commands have been completed.

Not only must a command pulse command an increment of motion, but it also must indicate the direction of that motion. For this, two channels are employed for each co-ordinate, the command pulses in one channel representing motion in one direction and the command pulses in the second channel representing motion in the opposite direction. Therefore, circuitry is required between the command pulse input and the counter which can operate the counter to count in the direction indicated by the motion ordered by the incoming command pulse.

The usual type of transducers employed for detecting motion provide two trains of signals in response to that motion, which signals are displaced in phase relative to one another. It is therefore necessary to provide circuitry which can not only detect the direction of motion from these trains of relatively displaced signals, but can apply signals in response thereto to cause the counter to add or subtract as determined by the motion detected. Furthermore, since both command and response pulses are being applied to the same counter, it is necessary to insure that there is no conflict in operation between the two inputs.

Control circuitry which can perform the above functions is shown in the above-noted application by Jack Rosenberg et al., and is also shown and claimed in an application by Jack Rosenberg et al., which is a division of the original and which is entitled Control Circuit, filed November 13, 1956, Serial No. 621,636, now U. S. Patent No. 2,817,775, and is assigned to a common assignee. This control circuitry operates satisfactorily for the purposes required; however, it requires a large number of tubes and other circuit components.

An object of the present invention is to provide an improved control circuit which is more economical to construct than the previous arrangement.

There are occasions in the operation of a machine-tool control where it is not desired to cut, but merely to rapidly transport a workpiece to a new position. On these occasions, it is desirable to move the machine-tool table at high speeds. In view of the large number of circuit components involved in the previous control circuitry, high speed operation was not as satisfactory as desired.

Accordingly, a further object of the present invention is to provide a control circuit arrangement which is capable of operation at high speeds.

Yet another object of the present invention is to provide an improved control circuit.

Still another object of the present invention is to provide a novel, simple, and unique control circuit arrangement.

These and other objects of the present invention are achieved by providing circuitry wherein at a first instant, established by the amplitude of the signal in one of two trains of signals produced in response to motion, the state of the second signal is stored. At a second instant, subsequent thereto, which is established by the condition of the signal in the first train of signals, the state of the second train is sensed again, to determine whether or not there has been a departure from the state which was stored in the previous instance. If such departure has occurred, indicative of the fact that motion has occurred, then a first and second pulse generator are actuated to generate first and second pulses. A first and second output terminal has these pulses applied to them, either first pulse to the first output terminal, second pulse to the second output terminal, or vice versa, as determined by the direction information indicated by the signal state stored in the first instant.

A command pulse may also be applied to the circuitry and the direction indicated by the command pulse is stored. The fact of the application of the command pulse to the circuitry is employed to actuate the same first and second pulse generator. The same gating means as was previously employed is used again, but this time under the control of the command pulse storage means. Accordingly, the first and second pulse will be applied to the first and second terminal or to the second and first terminal, as determined by the direction which is ordered by the command pulse. Prevention of faulty operation as a result of receiving the two inputs is provided by using gating means which, in the event that the response pulse circuitry has commenced operation prior to the command pulse circuitry, the command pulse circuitry is inhibited until after the response pulse circuitry has completed its operation. Further, in the event the command pulse circuitry operates first, then the response pulse circuitry is inhibited until after the command pulse circuitry has completed its operation. If both command and response arrive simultaneously, either of the two may take precedence and cause operation in response thereto without loss of information carried by the other.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a block diagram illustrating the servo-loop in which this invention finds utility; and Figure 2 is a block diagram of an embodiment of the invention.

Reference is now made to Figure 1 of the drawing, which shows in block diagram form an electrical digital servo-loop. One of these is required for each motion axis. A source of command pulses, such as the one described previously, provides a pulse on either one or the other of its two tracks, indicative of the direction of motion to be performed in response thereto. The command pulse is applied to a control circuit 2, which represents the embodiment of the invention herein. The output of the control circuit comprises two pulses which are received from two output terminals. One precedes the other and only one pulse is received from each output terminal. The order of these pulses on the output terminals are in response to the direction of motion being ordered. These two pulses are applied to a reversible counter 4. This counter will count one count for each pair of pulses.

In the application to Rosenberg et al. previously mentioned, the reversible counter preferred was a gas tube decimal type of counter which is sold commercially by Atomic Instruments Company of Boston, Massachusetts. These gas tube counters require two pulses to alter their count. Two input terminals are provided and, in order to advance the count, the first pulse must be applied to one of the input pulse terminals, followed by a second pulse applied to the second input terminal. In order to subtract or reduce the count indicated by the gas tube, the order of the application of these two pulses is reversed. Although this is the preferred type of counter, this is not to be construed as a limitation upon this invention, since techniques are well known for utilizing only the first appearing pulse on two output terminals and blocking the other for controlling the operation of subsequent apparatus.

The counter output is a number which is converted by a digital-to-analog converter 5 into a representative current, or voltage, whose polarity is also indicative of whether or not the number is a positive or negative number. The output of this digital-to-analog converter is applied to the apparatus which moves the machine tool. The controlled apparatus is indicated by the rectangle 6. Means are provided to generate signals whenever the controlled apparatus moves. These means are labeled as motion-transducer signal source 3.

The motion-transducer signal-generating apparatus may be any one of a number of well-known schemes, such as employ a light source, a photocell, and diffraction gratings interposed therebetween which provide different patterns when the table moves, whereby the photocell generates output pulses. Motion may also be sensed from the drive shaft, which is employed to drive the controlled apparatus using a suitable transducer such as those sold by the Farrand Corporation of New York City and which is called "Inductosyn." This apparatus is coupled to the drive shaft by means of suitable gearing and consists of a synchro of extreme accuracy. A magnetic transducing arrangement may also be employed wherein on two separate tracks two trains of pulses may be recorded which are in phase quadrature with one another. Two transducer heads may be positioned over the respective tracks. The magnetically recorded tracks are attached or actuated to move with the moving apparatus and the two heads are held stationary.

All of these arrangements produce as their output two trains of signals which are phase-displaced relative to one another. Control circuits must not only detect whether or not motion has occurred from these two trains of signals, but also the direction of such motion. Thus, these two trains of signals from the motion-transducer signal source 3 are also applied to the control circuit. This circuit will convert these signals to two pulse signals, the order of which corresponds to the direction of motion. These two signals are then applied to the output terminals, to be subtracted from the count which was entered by the command signals in response to which the controlled apparatus was moved.

Reference is now made to Figure 2, which shows a block diagram of the embodiment of the invention. To two input terminals 10, 12, there are applied the respective signal trains which are generated by a motion transducer. These signal trains are represented by the two full-wave-rectified signals, which are in quadrature with each other. A first Schmitt trigger circuit 14 is connected to the input terminal 10; a second Schmitt trigger circuit 16 is connected to the input terminal 12.

The Schmitt trigger circuit is a well-known type of trigger circuit which is described in an article by O. H. Schmitt, which is entitled a Thermionic Trigger Circuit, and is found described in the Journal of Scientific Instruments, volume 15, pages 24 through 26, January 1938. This trigger circuit has two states, one of which it assumes as long as there is an input applied thereto. It returns to the other state when its input is removed. The amplitude of the input signal required may be determined or controlled by selection of the bias and circuit component values of the two tube trigger circuit. The output derived as long as a pulse is applied to the trigger circuit is designated as a first, or "on," output; the other output derived when the pulse of the required amplitude is no longer being applied to the trigger circuit is designated as the second, or "off," output.

Schmitt trigger circuit 14 applies its "off" output to a pulse-generating network 18. Its "on" output is applied to a pulse-generating network 20. These pulse-generating networks are circuits which are employed for the purpose of producing a better defined output than the one received from the Schmitt trigger circuit. These pulse-generating networks in the embodiment of the invention provided fifty microsecond pulses as their outputs. They may be the passive type of network, consisting of resistors and condensers, or they may preferably be the active type, which include tubes, such as a one-shot multivibrator which, in response to its input, is driven to an unstable state for a time determined by its circuit constants and then returns to its stable state. Output is taken while it is in its unstable state.

The output of the pulse-generating network 18 is applied to two And gates 22, 24. These And gates are the well-known coincidence gates which require that all their inputs be simultaneously present before an output can be derived therefrom. Coincidence gates of a suitable type are found described and shown in the book entitled Electronics, by Elmore and Sands, pages 120 et seq., published by the McGraw-Hill Book Company in 1949. The second required input to And gate 22 is the "on" output of the Schmitt trigger circuit 16. The second required input to And gate 24 is the "off" output of Schmitt trigger circuit 16. The output of And gate 22 will set a storage and direction flip-flop 26. The output of And gate 24 will serve to reset the storage and direction flip-flop 26.

It should therefore become apparent that when Schmitt trigger 14 assumes its "off" state, flip-flop 26 will assume a first or a second stable condition, in accordance with whatever of the two outputs of the Schmitt trigger 16 are present at the time.

The "on" output of the Schmitt trigger 14 is applied through the pulse-generating network 20 to the inputs to two And gates 28 and 30. These may be termed motion-sensing And gates. A second required input to And gate 28 is the "on" output of Schmitt trigger 16; a second required input to And gate 30 is the "off" output of Schmitt trigger circuit 16. The third required input to And gate 28 is the reset, or first, stable state output of the flip-flop 26; the third required input to And gate 30 is the set, or second stable state output of flip-flop 26. The flip-flop circuit is well known and has two stable states producing an output indicative of the one in which it is. These two stable states may be designated as the first and second stable states, or as the reset and set stable states. Suitable flip-flop circuits are found described in pages 105 et seq. of the above-noted book by Elmore and Sands.

The outputs of And gates 28 and 30 are applied to an Or gate 32. The Or gate is merely a buffer circuit which provides an output upon the occurrence of any of its inputs. The output of Or gate 32 is applied to a second flip-flop circuit 34, which is designated as the motion flip-flop. Since flip-flop 26 stores the condition of the Schmitt trigger circuit 16, upon the occurrence of the first interval, an output will be derived from And gates 28 or 30 only if the condition of the Schmitt trigger circuit 16 output upon the occurrence of the second interval differs from what it was at the first interval. It will be appreciated that such difference is indicative of motion. If no motion has occurred, then the condition of Schmitt trigger circuit 16 remains the same, and its output is the same as when the storage direction flip-flop 26 was operated, and, therefore, no output will be derived from either And gate 28 or And gate 30. If motion has occurred, then flip-flop 34 is driven to its second, or set, stable state.

The output of flip-flop 34 is applied to a "hold" gate 36. This gate is known as an anti-coincidence gate. It has two input leads shown, the one from the motion flip-flop 34 and another from another gate which will be described later. This second input is known as an inhibit input—that is, in the presence of the second input, the hold gate is prevented from providing an output; in the absence of this second input, the hold gate will provide an output. These anti-coincidence gates are well-known circuits and are also found described in the previous reference Electronics.

The hold gate 36 output is applied first to an Or gate 38 and also to a "hold and direction gate" generator 39. This circuit is merely a pulse amplifier and phase-inverter circuit and its output is applied to several following circuits in a manner to be described.

The output of Or gate 38 is applied to a first pulse generator 40, which consists of a one-shot multivibrator or univibrator, the output of which is a first pulse. This univibrator output is applied to drive a second pulse generator 42, the output of which is a second pulse. The first pulse generator output is also applied to a third univibrator 44, which is termed a "wait-pulse" generator and which provides an output pulse after the circuit has completed its operations in response to the detection of motion. The output of the wait-pulse generator plus the output of the first pulse generator, plus the output of the hold and direction gate generator 39, are all applied to an And gate 46 for the purpose of resetting the motion flip-flop 34 to its initial stable condition.

The output of the hold and direction gate generator 39 is also applied to two And gates 48, 50. The second required input to And gate 50 is the reset output of the storage and direction flip-flop 26. The second required input to And gate 48 is the set output of the flip-flop 26. Flip-flop 26 outputs are indicative of the motion direction, since whatever the state to which the flip-flop was set in any previous operation cycle, it changes state or not upon the next motion increment occurring, depending upon whether or not motion occurs forward or backwards. The sensing of motion and direction occurs within a motion increment but not at the same point within a cycle for both directions of motion, but rather displaced 180 degrees, or one-half cycle. Thus, the one or the other of the And gates 48, 50 will be enabled.

The output from the And gate 48 is applied to an Or gate 52; the output from the And gate 50 is applied to an Or gate 54. Or gate 52 output is applied to two further And gates 56, 58; Or gate 54 output is applied to two And gates 60, 62. And gates 58 and 60 have as the second one of their required inputs an output from the first pulse generator 40; And gates 56, and 62 have as their second required input the output from the second pulse generator 42.

A first output terminal 64 and a second output terminal 66 receive the first and second pulses from the And gates in a manner to be described. Assuming And gate 48 applies its output through Or gate 52 to And gates 56 and 58, the first pulse from the first pulse generator 40 is applied to terminal 64; a second pulse from pulse generator 42 is applied through And gate 56 to terminal 66. If And gate 50 was enabled, its output is applied through Or gate 54 to And gate 60 and 62 and the first pulse in that case would be applied to output terminal 66 from And gate 60 and the second pulse would be applied to output terminal 64 from And gate 62. It may therefore be seen that the direction of motion which is stored in the flip-flop 26 determines whether a first pulse is received on output terminal 64 and a second pulse is received on output terminal 66, or vice versa.

From the above it may be seen that the input signals are sensed to determine the direction of motion as well as the fact that a motion has occurred. This information is then converted by the circuitry to provide two output pulses, one on each of two terminals, the order of occurrence of these pulses on the terminals being indicative of the direction of motion.

Two input terminals 70, 72 respectively receive command pulses representative of motion in one direction or the opposite direction. These two input terminals are connected to another direction storage flip-flop 74. They are also connected to an Or gate 76. The direction flip-flop will be set or reset, determined by which of the two input terminals is energized by the command pulse. The direction flip-flop output is applied to two And gates 86, 88. One or the other of these will be enabled as the result of the output therefrom. The output of the Or gate 76 is applied to a command flip-flop 78. This flip-flop circuit merely serves to store the information that a command pulse has been received. The output of the command flip-flop is applied to a hold gate 80, which has the identical circuitry as hold gate 36. This hold gate 80 therefore is also an anti-coincidence type of gate whereby the input which is applied thereto from the hold direction gate generator 39 serves to inhibit its operation.

An output is received from hold gate 80 only in the absence of the inhibit input. Assuming the absence of such inhibit input the hold gate output is applied to a hold and direction gate generator 82, which has the identical structure as the hold and direction gate generator 39. This gate phase inverts the input and generates an output having a sufficiently high amplitude to drive several subsequent circuits. The output of the hold and direction gate generator 82 is applied to an And gate 84, which, in the presence of a first pulse from the first-pulse generator 40 and a second pulse from the wait-pulse generator 44, serves to reset the command flip-flop. A second output from the hold and direction gate generator 82 is applied to the two And gates 86, 88 as the second required input. Thus, whichever of these two And gates is enabled by the direction flip-flop 74 will provide an output.

The output of And gate 86 is connected to Or gate 52; the output of And gate 88 is connected to Or gate 54. Thus, in the presence of an output from either And gate 86 or And gate 88, the appearance of the first and second pulse upon terminals 64 and 66 is determined. This appearance is in accordance with the information derived from the motion direction represented by the command pulse input. It should be noted that for the purposes of proper operation, the command pulse input occurs first; it is applied to the subsequent counter to be added (or subtracted, if motion is in a negative direction). The response pulse which follows should be applied to the arithmetic unit to be subtracted or to diminish the count which was established in response to the command pulse input.

Apparatus which prevents faulty operation of both circuits in the event of both circuits being energized comprises the hold gate 36 and the hold gate 80. In the event that hold and direction gate generator 82 is operated first in response to the output of the command flip-flop 78, then hold gate 36 is inhibited and will not operate until the command flip-flop 78 removes the energizing input. The output of command flip-flop 78 is not removed from the hold and direction gate generator 82 until it is reset. As previously described, this does not occur until after the input to And gate 84 has been provided by the wait-pulse generator 44. The wait-pulse generator 44 does not provide an output until the circuitry which is operated in response to the command pulse has ceased its operation.

Hold and direction gate generator 39 provides an inhibiting input to hold gate 80. This inhibiting input will not be removed until such time as the motion flip-flop 34 has been reset. This resetting operation will not occur until such time as the wait-pulse generator 44 has applied an input to And gate 46. Again, this interval will allow the circuitry which is energized in response to the two motion signal trains to complete its operation. If both command and response arrive simultaneously, either of the two may take precedence and cause operation in response thereto without loss of information carried by the other.

It should be understood that the output to the counter by the control circuit for a command pulse should be opposite to that for the motion signal trains generated in response to those command pulses.

Accordingly, there has been described and shown novel circuitry for taking the output of a motion transducer and the command signal outputs, establishing the priority in which these signals are received, detecting motion and direction of motion in the one case and providing as output a first and second pulse on two output terminals in a manner which is representative of the motion or to establish the direction of motion from the command pulse input and provide as output on the two output terminals the first and second pulse in a manner representative of the motion ordered by the command pulse. The circuitry is considerably simplified, since only one storage flip-flop is employed in the motion direction storage circuit; the same first and second pulse generators are employed for both motion response signals and command pulses; and the same output gating means are employed for ordering the output pulses in response to the directions of motion to be performed or motion already performed.

I claim:

1. A circuit for generating a first and second pulse in a manner representative of a direction of motion responsive to motion command pulses and to a first and second train of relatively phase-displaced signals generated responsive to motion comprising a first flip-flop having a first and a second stable state, first means enabled responsive to a signal in said first train exceeding a predetermined amplitude to drive said first flip-flop to a first stable condition responsive to the signal in said second train at the time exceeding a predetermined amplitude and to a second stable condition if said second train signal does not exceed said predetermined amplitude, a second flip-flop circuit having a first and second stable state, second means actuated responsive to the signal in said first train falling below said predetermined amplitude and the amplitude in said second train signal differing from what it was when said first means was enabled to drive said second flip-flop to its second stable state, a third flip-flop circuit having first and second stable states, means to drive said third flip-flop to its first stable state responsive to a command pulse indicative of motion in one direction and to its second stable state responsive to a command pulse indicative of motion in the opposite direction, a fourth flip-flop circuit having a first and second stable state, means to drive said fourth flip-flop circuit to its second stable state responsive to a command pulse being applied to said third flip-flop, means for establishing the priority of operation of said second and fourth flip-flops, first and second output terminals, means responsive to said second or fourth flip-flops being in their second stable states for generating a first pulse followed by a second pulse, means for ordering the application of said first and second pulses to said first and second output terminals under control of first one then the other of said first and third flip-flops in accordance with the priority indication provided by said means for establishing priority, said means for ordering including means for applying said first and second pulses respectively to said first and second output terminals or to said second and first output terminals responsive to said first flip-flop circuit being in its first or second stable state or to said third flip-flop being in its second or first stable state.

2. A circuit for generating a first and second pulse in a manner representative of a direction of motion responsive to motion command pulses and to a first and second train of relatively phase-displaced signals generated responsive to motion comprising first and second means to which said first and second trains of signals are applied, each said means generating a first output responsive to a signal exceeding a predetermined value and otherwise generating a second output, a first storage means, gate means enabled responsive to a first output from said first means to actuate said first storage means to store an indication of said second means output at the time, motion-indicating means, gate means to actuate said motion-indicating means responsive to a second output from said first means and to said second means output differing from the indication in said first storage means, means to store said motion indicative output, a flip-flop circuit having two stable states, means to apply command pulses to said flip-flop circuit to drive it to one stable state responsive to a pulse commanding one direction of motion and to the other stable state responsive to a pulse commanding another direction of motion, means to indicate that a command pulse has been applied to said flip-flop circuit, a first pulse generator, means to establish the priority of operation between the means to indicate a command pulse and the means to indicate motion, means to drive said first pulse generator responsive to each indicating means in a sequence controlled by said means to establish priority, a second pulse generator driven responsive to said first pulse-generator output, a first and a second output terminal, and means for ordering application of output from said first and second generators to said first and second output terminals under control of first one then the other of said means to indicate in accordance with the priority established by said means to indicate priority, said means for ordering including means to apply output from said first and second pulse generators respectively to said first and second terminals responsive to said first storage means indicating a first output and respectively to said second and first output terminals responsive to said first storage means indicating a second output and respectively to said first and second output terminals when said flip-flop circuit is in its other stable state and respectively to said second and first output terminals when said flip-flop circuit is in its one stable state.

3. A circuit for generating a first and second pulse in a manner representative of a direction of motion responsive to motion command pulses and to a first and second train of relatively phase-displaced signals generated responsive to motion comprising a first and a second trigger circuit to which said first and second trains of signals are respectively applied, each said trigger circuit providing a first output when a signal exceeds a predetermined value and a second output otherwise, a first flip-flop circuit having a first and second stable state, first gate means enabled responsive to a first output of said first trigger circuit to drive said first flip-flop circuit to a first or a second stable state respectively responsive to a first or second output of said second trigger circuit, a second flip-flop circuit having a first and second stable state, second gate means to drive said second flip-flop to its second stable state responsive to a second output from said first trigger circuit and an output from said second trigger circuit differing from the one represented by the stable state of said first flip-flop circuit, a third and a fourth flip-flop circuit each having a first and second stable state, means to apply command pulses to said third flip-flop circuit to drive it to a first stable state responsive to a pulse commanding one direction of motion and to a second stable state responsive to a pulse commanding another direction of motion, means to drive said fourth flip-flop circuit to its second stable state responsive to a command pulse being applied to said third flip-flop circuit, a first pulse generator, third gate means to drive said first pulse generator responsive to said second flip-flop being in its second stable state, means to inhibit said third gate means when said fourth flip-flop circuit is in its second stable state, fourth gate means responsive to said fourth flip-flop being in its second stable state to drive said first pulse generator, means to inhibit said fourth gate means when said second flip-flop is in its second stable state, a second pulse generator driven responsive to output from said first pulse generator, first and second output terminals, fifth gate means, means responsive to said first pulse generator being driven by said fourth gate means to order said fifth gate means to apply said first and second generator outputs respectively to said first and second output terminals or to said second and first output terminals responsive to said third flip-flop being in its first or second stable state, and means responsive to said first pulse generator being driven by said third gate means to order said fifth gate means to apply said first and second generator outputs respectively to said first and second output terminals or to said second and first output terminals responsive to said first flip-flop being in its second or first stable condition.

4. A circuit for generating a first and a second pulse in a manner representative of a direction of motion responsive to a first and second train of relatively phase-displaced signals generated responsive to motion comprising first and second means to which said first and second trains of signals are applied, each said means generating a first output responsive to a signal exceeding a predetermined value and otherwise generating a second output, storage means, means responsive to a first output of said first means to activate said storage means to store whether said second means is producing a first or a second output at the time, a first pulse generator, a second pulse generator, means responsive to a second output of said first means occurring after said first output to energize said first pulse generator, means to energize said second pulse generator from said first pulse generator output, a first pulse terminal, a second pulse terminal, and means responsive to said storage means storing a first output to couple said first and second pulse generator outputs respectively to said first and second pulse terminal and responsive to said storage means storing a second output to couple said first and second pulse generator outputs respectively to said second and first pulse terminals.

5. A circuit for producing a first and second pulse in a manner representative of a direction of motion responsive to a first and second train of relatively phase-displaced signals generated responsive to motion comprising first and second means to which said first and second trains of signals are applied, each said means generating a first output responsive to a signal exceeding a predetermined value and otherwise generating a second output, a flip-flop circuit having a first and second stable state, means actuated responsive to a first output from said first means to drive said flip-flop circuit to a first stable state responsive to a first output from said second means and to a second stable state responsive to a second output from said second means, first and second pulse generators, means responsive to a second output from said first means and an output from said second means which differs from the one represented by the stable state of said flip-flop circuit to drive said first generator, means to drive said second generator from the output of said first generator, first and second pulse terminals, means to apply said first and second generator outputs respectively to said first and second pulse terminals responsive to said flip-flop being in said first stable state, and means to apply said first and second generator outputs respectively to said second and first terminals responsive to said flip-flop circuit being in said second stable state.

6. A circuit as recited in claim 5 wherein said means responsive to a second output from said first means and an output from said second means which differs from the one represented by the stable state of said flip-flop circuit comprises a pair of coincidence gates each of which requires a coincidence in the presence of all its inputs to provide an output, one of said coincidence gates being coupled to receive a second output from said first means, a second output from said second means, and output from said flip-flop circuit when in its first stable state, the other of said coincidence gates being coupled to receive a second output from said first means, a first output from said second means and output from said flip-flop circuit when in its second stable state.

7. A circuit for producing a first and second pulse in a manner representative of a direction of motion responsive to a first and second train of relatively phase-displaced signals generated responsive to motion comprising a first and a second trigger circuit to which said first and second trains of signals are respectively applied, each said trigger circuit providing a first output when a signal exceeds a predetermined value and a second output otherwise, a flip-flop circuit having a first and second stable state, first gate means actuated responsive to a first output of said first trigger circuit to drive said flip-flop circuit to a first or a second stable state corresponding to a first or a second output of said second trigger circuit, second gate means actuated responsive to a second output of said first trigger circuit to produce an output when the output of said second trigger circuit and the output to which said flip-flop circuit stable state corresponds differ, a first pulse generator actuated responsive to said second gate means output, a second pulse generator actuated responsive to output from said first pulse generator, first and second output terminals, third gate means enabled responsive to said second gate means output to apply the output of said first and second pulse generators respectively to said second and first output terminals responsive to said flip-flop circuit being in its second stable state.

8. A circuit for producing a first and second pulse in a manner representative of a direction of motion responsive to a first and second train of relatively phase-displaced signals generated responsive to motion comprising a first and a second trigger circuit to which said first and second trains of signals are respectively applied, each said trigger circuit providing a first output when a signal exceeds a predetermined value and a second output otherwise, a flip-flop circuit having a first and second stable state, a first coincidence gate coupled to drive said flip-flop to its first stable state responsive to a first output from both said first and second trigger circuits, a second coincidence gate coupled to drive said flip-flop to its second stable state responsive to a first output from said first trigger circuit and a second output from said second trigger circuit, a third coincidence gate producing an output representative of motion responsive to a second output from both said first and second trigger circuits and said flip-flop circuit being in its first stable state, a fourth coincidence gate producing an output indicative of motion responsive to a second output from said first trigger circuit, a first output from said second trigger circuit and said flip-flop circuit being in its second stable state, a first pulse generator, means to actuate said first pulse generator responsive to either output indicative of motion to produce a first pulse, a second pulse generator actuated responsive to the output of said first pulse generator to produce a second pulse, first and second output terminals, and gate means responsive to said flip-flop being in its first stable state to apply output from said first and second pulse generators respectively to said first and second output terminals and in said second stable state to apply output from said first and second pulse generators respectively to said second and first output terminals.

References Cited in the file of this patent

UNITED STATES PATENTS

| | | |
|---|---|---|
| 2,677,758 | Robinson et al. | May 4, 1954 |
| 2,700,501 | Wang | Jan. 25, 1955 |
| 2,754,494 | Brown | July 10, 1956 |
| 2,762,949 | Huffman | Sept. 11, 1956 |
| 2,788,519 | Caldwell | Apr. 9, 1957 |